United States Patent
Luk (10) Patent No.: US 8,838,558 B2
(45) Date of Patent: Sep. 16, 2014

(54) HASH LOOKUP TABLE METHOD AND APPARATUS

(75) Inventor: King Wayne Luk, Elk Grove, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2067 days.

(21) Appl. No.: 11/891,147

(22) Filed: Aug. 8, 2007

(65) Prior Publication Data

US 2009/0041017 A1 Feb. 12, 2009

(51) Int. Cl.
*G06F 7/00* (2006.01)
*G06F 17/00* (2006.01)
*H04L 12/741* (2013.01)
*G06F 17/30* (2006.01)
*H04L 12/701* (2013.01)

(52) U.S. Cl.
CPC .............. *H04L 45/00* (2013.01); *H04L 45/745* (2013.01); *G06F 17/30949* (2013.01)
USPC ........................... 707/698; 709/238; 709/244

(58) Field of Classification Search
None
See application file for complete search history.

(56) References Cited

U.S. PATENT DOCUMENTS

| | | | |
|---|---|---|---|
| 7,039,764 B1 * | 5/2006 | Shetty et al. | 711/133 |
| 7,107,258 B2 * | 9/2006 | Cheng et al. | 707/698 |
| 7,467,228 B2 * | 12/2008 | Roeder et al. | 709/240 |
| 2003/0182291 A1 * | 9/2003 | Kurupati et al. | 707/100 |
| 2003/0210689 A1 * | 11/2003 | Davis et al. | 370/389 |
| 2005/0083937 A1 * | 4/2005 | Lim | 370/392 |
| 2005/0195812 A1 * | 9/2005 | Wybenga et al. | 370/389 |
| 2006/0212426 A1 * | 9/2006 | Shakara et al. | 707/3 |
| 2007/0115986 A1 * | 5/2007 | Shankara | 370/392 |
| 2008/0034115 A1 * | 2/2008 | Chu et al. | 709/239 |

* cited by examiner

*Primary Examiner* — Robert Beausoliel, Jr.
*Assistant Examiner* — Hexing Liu (57) ABSTRACT

A method includes generating an N-bit generated hash key for an M-bit search key. A data value associated with a matching hash key stored in a content addressable memory is retrieved. The matching hash key is then validated. The content addressable memory supports $2^k$ entries, wherein $M>N>k$.

18 Claims, 7 Drawing Sheets

HASH LOOKUP TABLE METHOD AND APPARATUS

BACKGROUND

Network performance relies in part on the rate at which network nodes can handle incoming packets. The node must be capable of handling packets at least as fast as the packets arrive.

The nodes analyze a packet to determine where to send the packet. The node can make a decision whether to and where the packet should be forwarded, for example, based upon a source network location or destination network location identified by the packet. The speed with which the node is able to act on the packet is a limiting factor for network performance.

There are established network protocols relating to address resolution. Node throughput is based at least in part on the speed with which the destination port can be determined from the packet-provided network location. Typically the node maintains a lookup table that aids in determining which port to forward a packet to. There may be a very large space of possible addresses that the node must be capable of handling, however, the table memory inherently has a finite storage space. The lookup table associates a network location with a data value such as the port to forward a packet having that network location.

One approach for achieving a fast lookup uses content addressable memories (CAM). A typical memory returns data located at a specified memory address. A CAM permits simultaneous comparison of an M-bit match section of every table entry with a given value to identify the location of table entry having a match section matching the packet-provided network location. The length of time required for the search is independent of the size of the lookup table. However, for a $2^k$ entry table, a CAM requires die space sufficient to implement M $2^k$-input comparators and thus can require significant die space depending upon the size of the table and the width of the network location.

Another approach uses a hash function to compress the potential addressable network space to fit within the finite memory provided for the lookup table. A received network location is hashed to identify a specific entry in the lookup table. Due to the finite table lookup memory and the potentially very large addressable network space, the hash function is likely to generate the same address in memory for many different network locations. The result is a "collision". Collisions require rehashing to identify alternate locations or other techniques in order to avoid reuse of the already used memory location. Given that the table is expected to be nearly full for efficient use of die space, there is a high probability of collision. The hash function can make efficient use of the finite storage space, however, the performance hit due to collisions may render a hash approach impractical for high-speed applications.

SUMMARY

Various embodiments of methods and apparatus for implementing a hash table lookup are described. In one embodiment, a method includes generating an N-bit generated hash key for an M-bit search key. A data value associated with a matching hash key stored in a content addressable memory is retrieved. The content addressable memory supports $2^k$ entries, wherein M>N>k. The matching hash key is then validated.

In one embodiment, a method includes generating an N-bit generated hash key for an M-bit search key identified by a received packet. A data value associated with a matching hash key stored in a content addressable memory is retrieved. The content addressable memory supports $2^k$ entries, wherein M>N>k. The packet is forwarded to a port identified by the data value.

In one embodiment, an apparatus includes a processor and a content addressable memory supporting $2^k$ entries. The processor generates an N-bit generated hash key for an M-bit search key specified in a received packet. The processor retrieves a data value associated with a matching hash key stored in the content addressable memory, wherein M>N>k. The processor and content addressable memory reside on a same semiconductor die.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Figure 1:
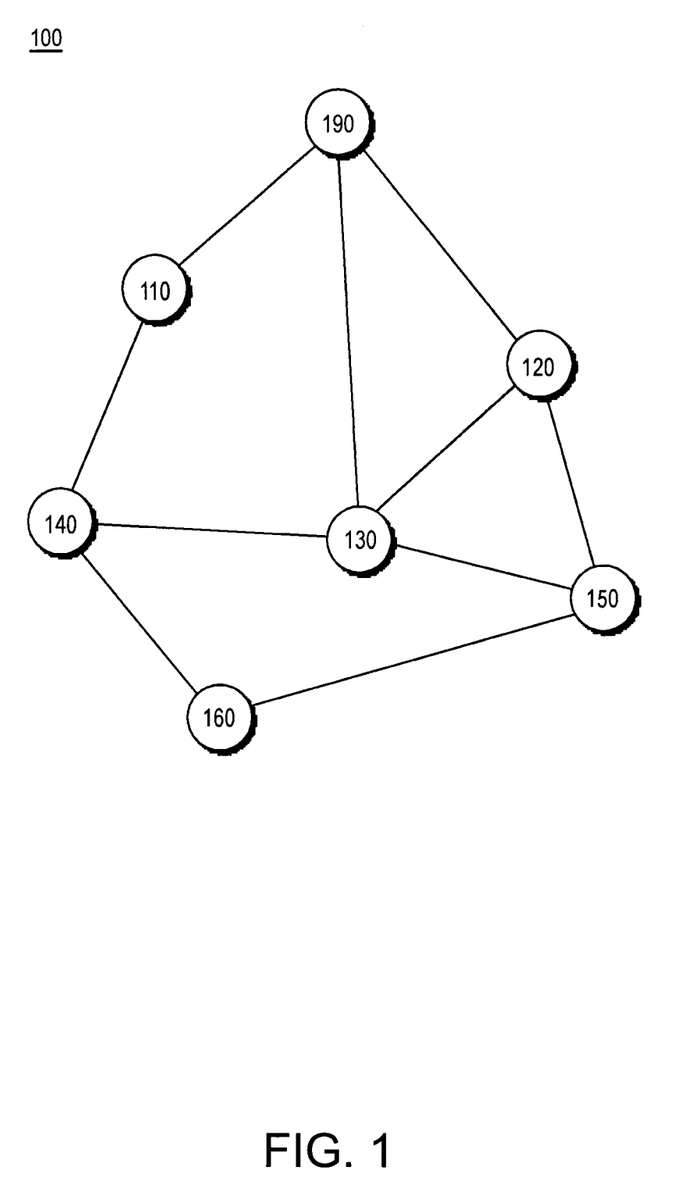
FIG. 1 illustrates one embodiment of a network.

FIG. 1 illustrates a network 100 including a plurality of communicatively coupled nodes 110, 120, 130, 140, 150, 160, and 190. In one embodiment, the network is a packet-switched network. Packet-switched networks fragment and package data into packets that may be of varying length. Each packet includes a header. Nodes may be sources or destinations of packets.

Although the network may be an "intranet" designed primarily for access between computers within a private network, in one embodiment network 100 represents a portion of the network commonly referred to as the Internet. These nodes may include routers, switches, hubs, repeaters, gateways, bridges, and communications links.

Figure 2:
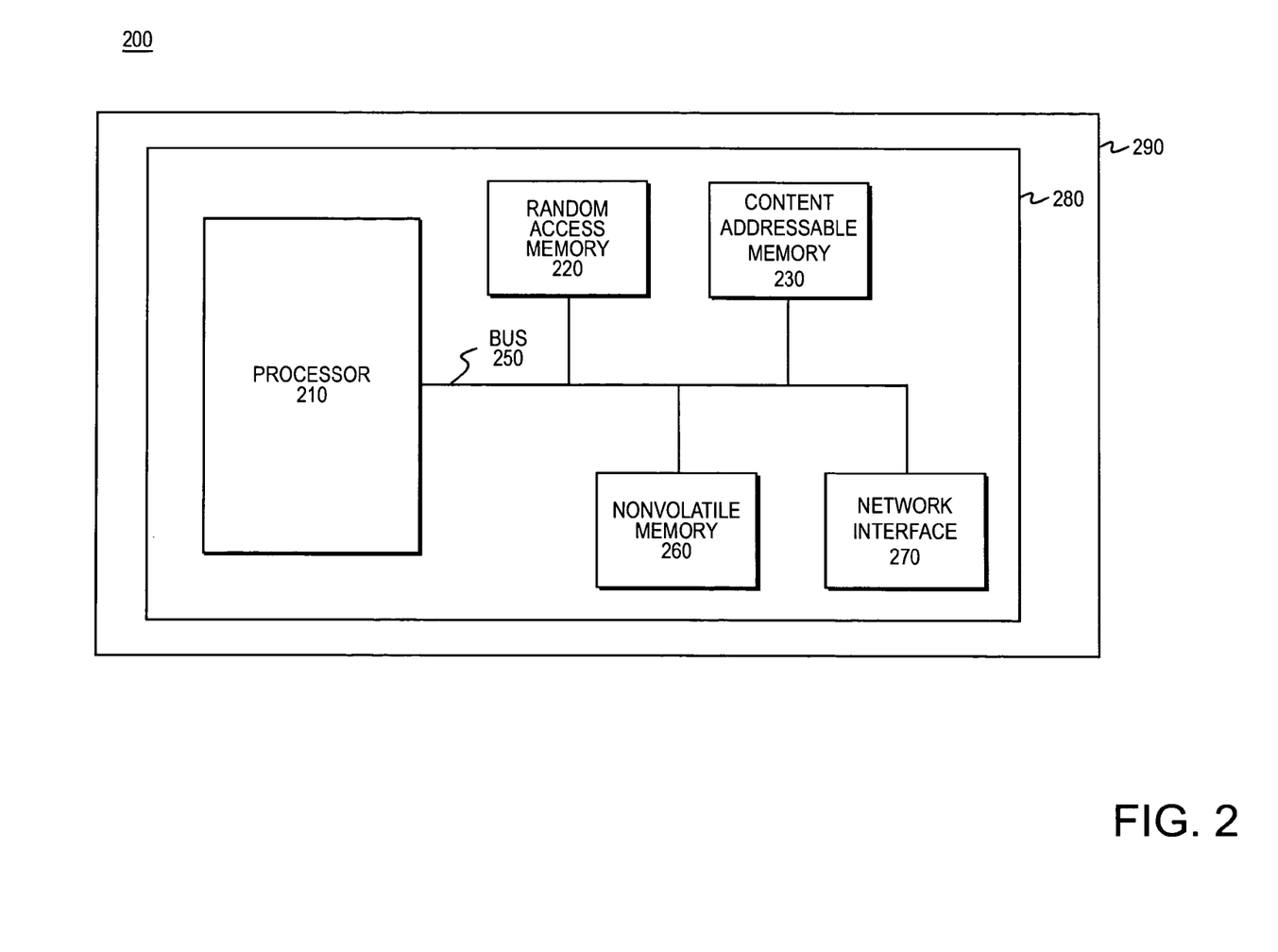
FIG. 2 illustrates one embodiment of a network node.

FIG. 2 illustrates one embodiment of a network node 200. The node includes a processor 210 and a network interface 280. Node 200 includes random access memory (RAM) 220 used by the processor during program execution. RAM 220 is typically a volatile memory and does not retain its contents once power is removed from the sensor node. CAM 230 is a content addressable memory. Routing tables describing the reachability of other nodes of the network may be stored in RAM 220.

Node 200 may include nonvolatile memory 260 for storing configuration settings even when the node is powered down. These configuration settings might describe the amount of RAM, CAM and characteristics about the network interface 270, for example. The nonvolatile memory may also store any program code required for node operations and communications via the network interface 270.

In one embodiment, nonvolatile memory 260 is a semiconductor-based memory. Various types of nonvolatile media including electrically erasable programmable read only memory (EEPROM), flash electrically re-writable memory, and battery-backed complementary metal oxide semiconductor (CMOS) are available. CAM 230 and RAM 220 may also be semiconductor memories. RAM 220, CAM 230, nonvolatile memory 260, and network interface 270 are communicatively coupled to the processor 210 through one or more buses such as bus 250.

In one embodiment, the processor, RAM, and CAM reside on a same semiconductor die 280 within the same integrated circuit package 290. In one embodiment, the semiconductor die is fabricated as a complementary metal oxide semiconductor (CMOS).

Figure 3:
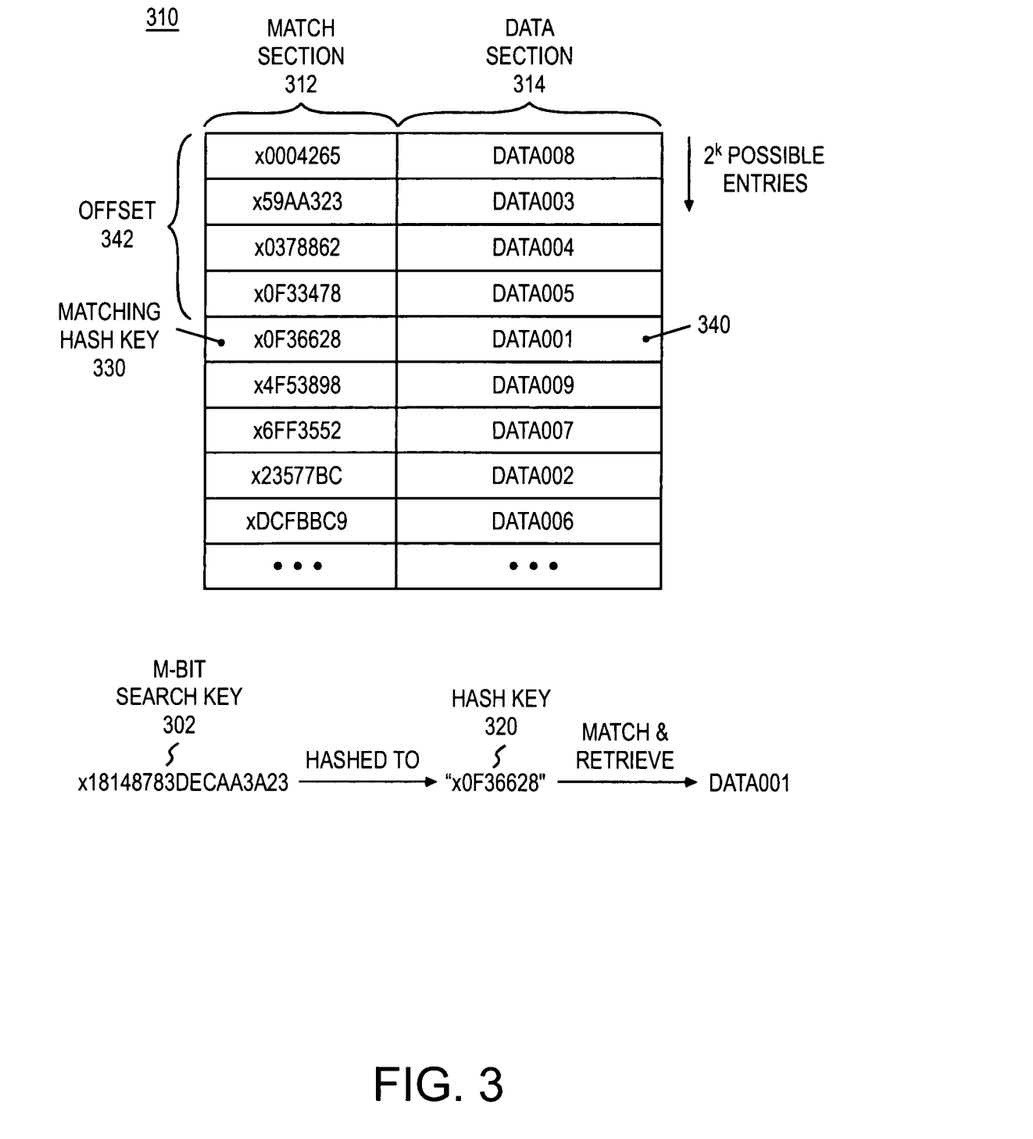
FIG. 3 illustrates one embodiment of a lookup table.

FIG. 3 illustrates one embodiment of a lookup table 310. The lookup table has a match section 312 and a data section 314. Although the table may have any number of entries (i.e., rows), in one embodiment the table permits $2^k$ entries where k is a positive integer for efficient use of memory. In one embodiment, the match section is M bits wide where M is a positive integer to facilitate matching an M-bit search key. Generally, a search key (320) is compared with the values stored in the match section 312. When there is a match (330), the associated data value (340) from the data section is returned.

Using a RAM based lookup table is much slower than using a CAM-based lookup. However, due to the additional hardware requirements imposed by comparators, an M-bit CAM takes up considerably greater die space compared to the RAM.

In order to conserve memory and die space to facilitate a CAM-based lookup, an N-bit match section is used where M>N. An N-bit hash is applied to the M-bit search key in order to require N-bits rather than M-bits for the match section. Thus for the CAM-based lookup match section 312 is N-bits wide where M>N.

N is selected such that M>N>k. The result is a table of virtual size $2^N$ entries with an actual size of $2^k$ entries. N is selected to be sufficiently larger than k to reduce hash collision rate. N is selected to be sufficiently smaller than M to conserve die area required for a CAM. If k=12, N=32, and M=512, for example, the result is a virtual hash table of size $2^{32} \approx 4$ billion entries collapsed into a $2^{12}=4096$ entry lookup table.

Although the relative scaling of M, N, and k is particular to the application and the desired size of the hash lookup table, in one embodiment M, N, and k are selected such that $$\frac{N}{k} \geq 1.5 \text{ and } \frac{M}{N} \geq 2.$$

The hash lookup table is representative of the number of active flows in networking nomenclature.

The use of a virtual N-bit hash table permits the use of N-bit CAMs rather than M-bit CAMs. In the example illustrated above, this results in a $2^{12} \times 32$ rather than a $2^{12} \times 512$ CAM structure. The reduction in the match section for the CAM-based lookup table enables either smaller die sizes or larger lookup tables or both while preserving the efficiency of a CAM-based lookup.

Given that M>N, there is more than one M-bit search key that will hash to the same N-bit match value. Such matches can result in "collisions" where the looked up value does not correspond to the correct M-bit search key.

A lookup may result in a "hit" in which a match is found or a "miss" when no match is found. Given that M>N, a "hit" must be validated to ensure that the retrieved data is associated with the M-bit search key originally provided. In particular, the hit must be validated to ensure that the matching hash key is derived from the M-bit search key. Validation may be performed at a higher protocol level without requiring any additional resources on-chip. This disclosure is concerned with improvements relating to the implementation of the table itself.

Figure 4:
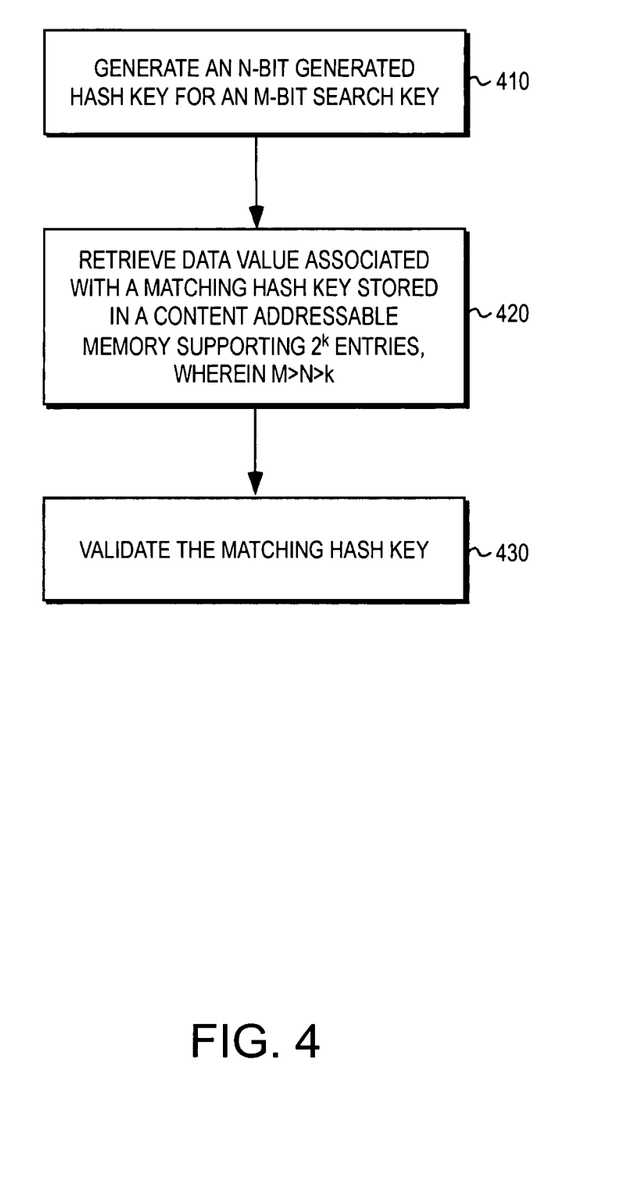
FIG. 4 illustrates one embodiment of a method of retrieving data associated with a hash key.

FIG. 4 illustrates one embodiment of a method of retrieving data associated with a hash key. An N-bit generated hash key is generated for a received M-bit search key in step 410. The search key may correspond, for example, to a source address or destination address on the network. The search key may be specified, for example, within a packet. The search key may include, for example, one or more of the following: internet protocol (IP) source address, IP destination address, source media access control (MAC) address, destination MAC address, layer four transmission control protocol (TCP) port numbers, etc.

The router, bridge, or other decision-making device receiving the packet must make a decision as to how to handle the packet based at least in part upon an indicated network address. This is sometimes referred to as "Layer 2 routing" or "Layer 2 switching". The data section of the lookup table, for example, may identify a port to which the packet should be forwarded.

The network node may make more sophisticated decisions based on factors other than or in conjunction with the indicated network address. When the node makes such decisions based upon lower level information embedded within the packet, this may be referred to as "Layer 3 routing" or "Layer 3 switching".

Regardless of the level of analysis involved for making a decision, the node must act on the packet. The packet may be forwarded to a particular port or simply dropped, for example.

Referring to step 420, a data value associated with a matching hash key located in a content addressable memory is retrieved. In one embodiment, the content addressable memory is a binary content addressable memory. The content addressable memory supports $2^k$ entries wherein M>N>k.

Referring to FIG. 3, for example, an M-bit search key 302 is hashed into an N-bit hash key "x0F36628" (320). This hash key is matched to hash key "x0F36628" (330) at offset 342 in the content addressable memory. Accordingly, the data value "DATA001" 340 is returned.

The matching hash key is validated in step 430. Given that M>N, there is a possibility of a "collision" where multiple M-bit search keys hash to the same N-bit hash key. The use of an N-bit hash key, however, significantly reduces the likelihood of collision. For a 4096 entry hash key lookup table (k=12) and a 4 billion virtual hash key space (N=32), a collision rate of approximately one in a million (i.e., one per $2^{20}$) is estimated as an upper bound. Choosing a virtual hash key space (e.g., $2^N$ possible mappings) much larger than the space defined by the lookup table (e.g., $2^k$ entries) but smaller than the possible key space (e.g., $2^M$ possible search keys) significantly reduces the likelihood of collisions while improving both the lookup efficiency and the hardware requirements for accomplishing the lookup.

To ensure that the matching hash key is derived from the same M-bit search key, a validation check must occur. There are several approaches to validating the matching hash key.

In one approach, the matching hash key is validated using a higher layer validation algorithm. This approach would not require additional on-chip resources to validate the match.

Another approach is to utilize an M-bit hash validation lookup table. In particular, the packet-provided M-bit search key must be compared with the M-bit search key from which the N-bit matching hash key entry was generated.

The CAM provides a very fast and efficient solution to locating a matching hash key compared to performing a search in RAM. Organizing the validation entries of the RAM to have the same offset as their corresponding hash keys in the CAM enables elimination of an otherwise time consuming search through the RAM for validation.

Figure 5:
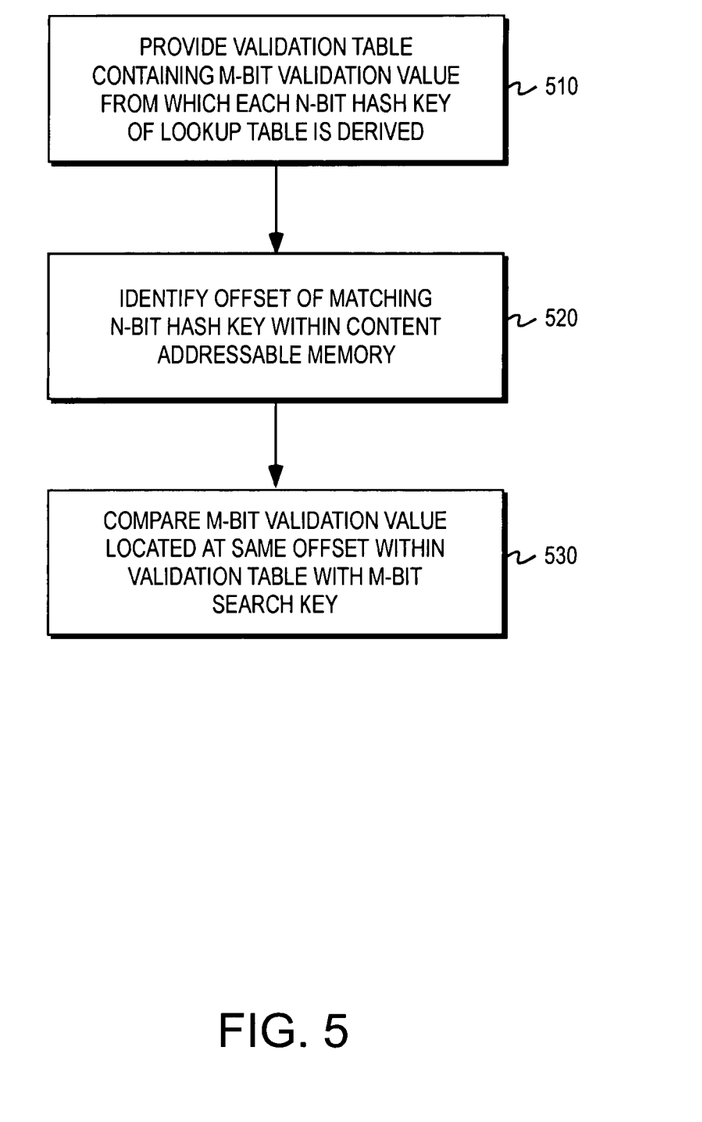
FIG. 5 illustrates one embodiment of a hash key validation.

FIG. 5 illustrates one embodiment of a method of validating a matching hash key with a hash key validation table. In step 510, a validation table containing an M-bit validation value from which the N-bit matching hash key was derived is provided. The offset of the matching hash key in the CAM is identified in step 520. The validation table supports up to $2^k$ entries and each M-bit validation value is located at the same offset in the validation table as the corresponding N-bit matching hash key is located within the CAM. The validation table is located in a memory distinct from that of the hash key lookup table.

In step 530, the M-bit validation value located at the same offset within the validation table is compared with the M-bit search key. If they are the same, then the matching hash key has been successfully validated. If they are not the same then the match is declared invalid.

Figure 6:
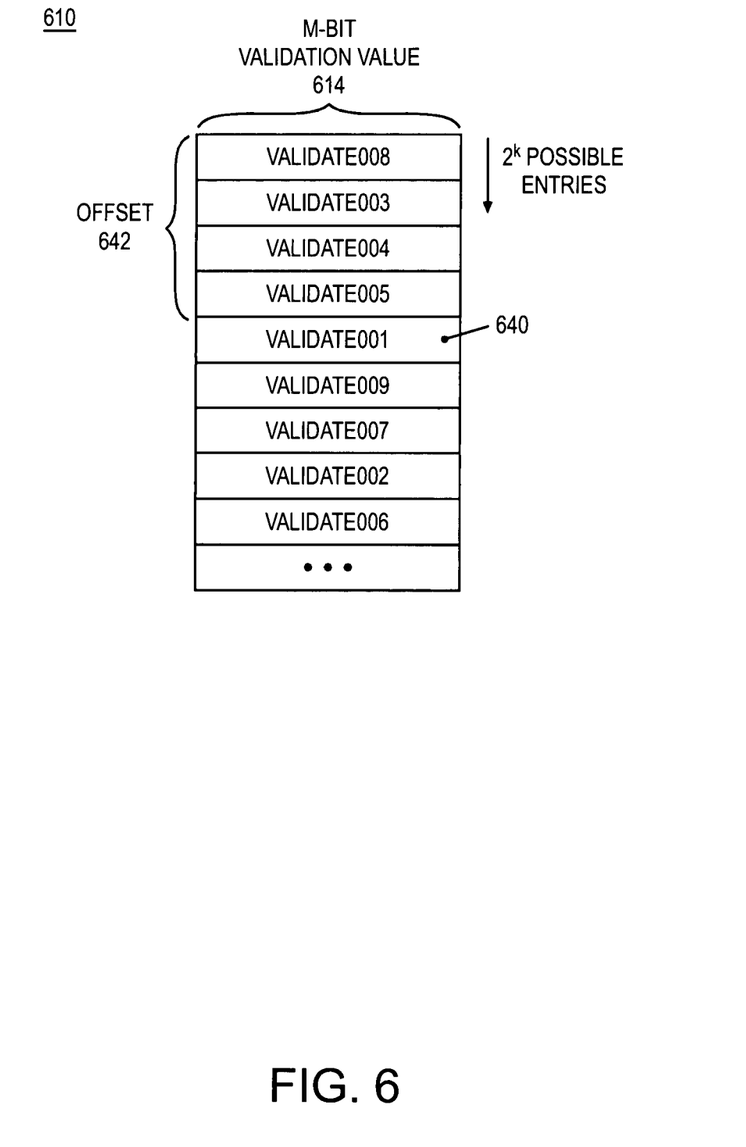
FIG. 6 illustrates one embodiment of a validation table.

FIG. 6 illustrates one embodiment of a validation table 610 having a plurality of validation values 614. In one embodiment, the validation table is stored in a memory residing on a same semiconductor die as the content addressable memory storing the hash key lookup table. The offset 642 from one end of the validation table to the validation value 640 is the same as the offset 342 within the hash key lookup table 310 associated with the matching hash key 320. In one embodiment, the validation table is stored in a random access memory such as RAM 220 of FIG. 2.

There are numerous techniques for resolving invalid matches. Although not illustrated in the present disclosure, re-hashing is one approach of handling the case when multiple M-bit search keys hash to the same value as the lookup table is populated. Accordingly, an M-bit search key that hashes to the same value as an existing hash key associated with a different M-bit search key may simply be re-hashed to a new hash key and stored elsewhere in the CAM. Given this possibility, the validation process may likewise consider re-hashing to attempt to locate the correct hash key and associated data in the event an invalid match is encountered.

The use of the CAM accelerates both the lookup and any on-chip validation process given that the location of the validating value is known. Although the memory required for a validation table consumes die space, the space consumed is a fraction of that otherwise required for a larger CAM. If validation is performed at a higher layer protocol, then no additional on-chip resources are required.

Figure 7:
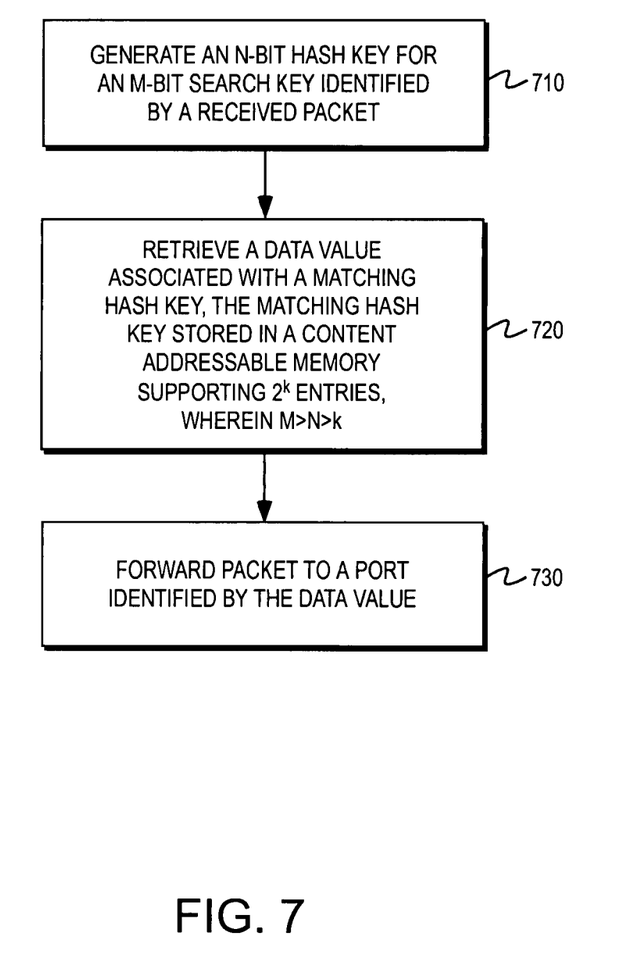
FIG. 7 illustrates one embodiment of a method of processing a packet.

FIG. 7 illustrates one embodiment of a method of processing a packet. An N-bit hash key is generated for an M-bit search key identified by a received packet in step 710. In various embodiments, the M-bit search key may correspond to one or more of a network source address, destination address, IP source address, IP destination address, source MAC address, destination MAC address, or a TCP port, for example. A data value associated with a matching hash key is retrieved from a content addressable memory in step 720. The matching hash key is stored in a content addressable memory supporting $2^k$ entries wherein M>N>k. The packet is forwarded to a port identified by the data value in step 730.

In the preceding detailed description, embodiments of the invention are described with reference to specific exemplary embodiments thereof. Various modifications and changes may be made thereto without departing from the broader scope of the invention as set forth in the claims. The specification and drawings are, accordingly, to be regarded in an illustrative rather than a restrictive sense.

What is claimed is:

1. A method comprising:
   a) generating an N-bit generated hash key for an M-bit search key;
   b) retrieving a data value associated with a matching hash key stored in a content addressable memory supporting a maximum of $2^k$ possible entries, wherein M >N >k; and
   c) validating the matching hash key, wherein validating the matching hash key includes:
      identifying an offset for the matching hash key in the content addressable memory; and
      comparing the M-bit search key with an M-bit validation value from which the matching hash key was made, the M-bit search key being stored at a same offset in a validation table in a memory distinct from the content addressable memory.

2. The method of claim 1 wherein the search key is specified within a received packet.

3. The method of claim 2 further comprising:
   d) forwarding the packet to a port identified by the data value.

4. The method of claim 1 wherein the validation table is stored in a random access memory.

5. The method of claim 4 wherein the random access memory and the content addressable memory reside on a same semiconductor die.

6. The method of claim 1, wherein the content addressable memory stores the entries in a $2^k$ lookup table, and the retrieving comprises comparing the N-bit generated hash key to one or more of the entries in the $2^k$ lookup table to identify the matching hash key.

7. A method comprising:
   generating, by a processor, an N-bit generated hash key for an M-bit search key identified by a received packet;
   retrieving, from a content addressable memory having an entry comprising a hash key matching the generated hash key, a data value associated with the matching hash key, the content addressable memory supporting a maximum of $2^k$ possible entries, wherein M >N >k;
   validating the matching hash key, wherein validating the matching hash key includes:
      identifying an offset for the matching hash key in the content addressable memory; and
      comparing the M-bit search key with an M-bit validation value from which the matching hash key was made, the M-bit validation value being stored at a same offset in a validation table memory distinct from the content addressable memory; and
   forwarding the packet to a port identified by the data value.

8. The method of claim 7 wherein the content addressable memory is a binary content addressable memory.

9. The method of claim 7 wherein the data value is retrieved from the content addressable memory.

10. The method of claim 7 wherein $$\frac{N}{k} \geq 1.5.$$

11. The method of claim 7 wherein $$\frac{M}{N} \geq 2.$$

12. An apparatus comprising:

a processor to generate an N-bit generated hash key for an M-bit search key specified in a received packet; and a content addressable memory supporting a maximum of $2^k$ possible entries, the content addressable memory storing an entry comprising a hash key matching the generated hash key and a data value associated with the matching hash key; and a random access memory, wherein the processor is to identify an offset for the matching hash key in the content addressable memory and to compare the M-bit search key with an M-bit validation value from which the matching hash key was made, the M-bit search key being stored at a same offset in a validation table in the random access memory, wherein the processor is to retrieve the data value associated with the matching hash key, and wherein the processor and content addressable memory reside on a same semiconductor die, wherein M >N >k.

13. The apparatus of claim 12 further comprising:

a network interface to communicate packets, the network interface to provide the received packet to the processor.

14. The apparatus of claim 13 wherein the network interface resides on the same semiconductor die.

15. The apparatus of claim 12 wherein the random access memory resides on the same semiconductor die.

16. The apparatus of claim 12 wherein the semiconductor die is fabricated as a complementary metal oxide semiconductor die.

17. The apparatus of claim 12 wherein the processor communicates the packet to a port identified by the data value.

18. The apparatus of claim 12 wherein N is selected to ensure at least one of $$\frac{N}{k} \geq 1.5 \text{ and } \frac{M}{N} \geq 2.$$

* * * * *